SWITCHING MATRIX

Filed Jan. 10, 1963 6 Sheets-Sheet 1

INVENTOR.
ROLF B. LOCHINGER
BY Samuel Cohen
Attorney

INVENTOR.
ROLF B. LOCHINGER
BY
Samuel Cohen
Attorney

March 7, 1967 R. B. LOCHINGER 3,308,433

SWITCHING MATRIX

Filed Jan. 10, 1963 6 Sheets-Sheet 3

INVENTOR.
ROLF B. LOCHINGER
BY
Samuel Cohen
Attorney

INVENTOR.
ROLF B. LOCHINGER
BY
[signature]
Attorney

INVENTOR.
ROLF B. LOCHINGER
BY
Attorney

| Switch Nº | Read | | | | | | | | | | | | | | | | Write | | | | | | | | | | | | | | | |
|---|---|---|---|---|---|---|---|---|---|---|---|---|---|---|---|---|---|---|---|---|---|---|---|---|---|---|---|---|---|---|---|---|
| Selected Core | A | AA | B | BB | $C_1$ | $C_2$ | $C_3$ | $D_1$ | $D_2$ | $D_3$ | $E_1$ | $E_2$ | $E_3$ | $F_1$ | $F_2$ | $F_3$ | A | AA | B | BB | $C_1$ | $C_2$ | $C_3$ | $D_1$ | $D_2$ | $D_3$ | $E_1$ | $E_2$ | $E_3$ | $F_1$ | $F_2$ | $F_3$ |
| 1-1 | C | O | O | C | C | O | O | C | C | O | O | O | C | O | C | C | O | C | C | O | C | O | O | C | C | O | O | O | C | O | C | C |
| 1-2 | C | O | O | C | C | O | O | C | O | C | O | O | C | O | C | C | O | C | C | O | C | O | O | C | O | C | O | O | C | O | C | C |
| 1-3 | C | O | O | C | C | O | O | O | C | C | O | O | C | O | C | C | O | C | C | O | C | O | O | O | C | C | O | O | C | O | C | C |
| 1-4 | C | O | O | C | O | C | O | C | C | O | O | O | C | O | C | C | O | C | C | O | O | C | O | C | C | O | O | O | C | O | C | C |
| 1-5 | C | O | O | C | O | C | O | C | O | C | O | O | C | O | C | C | O | C | C | O | O | C | O | C | O | C | O | O | C | O | C | C |
| 1-6 | C | O | O | C | O | C | O | O | C | C | O | O | C | O | C | C | O | C | C | O | O | C | O | O | C | C | O | O | C | O | C | C |
| 1-7 | C | O | O | C | O | O | C | C | C | O | O | O | C | O | C | C | O | C | C | O | O | O | C | C | C | O | O | O | C | O | C | C |
| 1-8 | C | O | O | C | O | O | C | C | O | C | O | O | C | O | C | C | O | C | C | O | O | O | C | C | O | C | O | O | C | O | C | C |
| 1-9 | C | O | O | C | O | O | C | O | C | C | O | O | C | O | C | C | O | C | C | O | O | O | C | O | C | C | O | O | C | O | C | C |
| 2-1 | C | O | O | C | C | O | O | C | C | O | O | O | C | C | O | C | O | C | C | O | C | O | O | C | C | O | O | O | C | C | O | C |
| 3-1 | C | O | O | C | C | O | O | C | C | O | O | O | C | C | C | O | O | C | C | O | C | O | O | C | C | O | O | O | C | C | C | O |
| 4-1 | C | O | O | C | C | O | O | C | C | O | O | C | O | O | C | C | O | C | C | O | C | O | O | C | C | O | O | C | O | O | C | C |
| 5-1 | C | O | O | C | C | O | O | C | C | O | O | C | O | C | O | C | O | C | C | O | C | O | O | C | C | O | O | C | O | C | O | C |
| 6-1 | C | O | O | C | C | O | O | C | C | O | O | C | O | C | C | O | O | C | C | O | C | O | O | C | C | O | O | C | O | C | C | O |
| 7-1 | C | O | O | C | C | O | O | C | C | O | C | O | O | O | C | C | O | C | C | O | C | O | O | C | C | O | C | O | O | O | C | C |
| 8-1 | C | O | O | C | C | O | O | C | C | O | C | O | O | C | O | C | O | C | C | O | C | O | O | C | C | O | C | O | O | C | O | C |
| 9-1 | C | O | O | C | C | O | O | C | C | O | C | O | O | C | C | O | O | C | C | O | C | O | O | C | C | O | C | O | O | C | C | O |
| 9-9 | C | O | O | C | O | O | C | O | C | C | C | O | O | C | C | O | O | C | C | O | O | O | C | O | C | C | C | O | O | C | C | O |
| 6-5 | C | O | O | C | O | C | O | C | O | C | O | C | O | C | C | O | O | C | C | O | O | C | O | C | O | C | O | C | O | C | C | O |

Fig. 7.

O: OPEN
C: CLOSED

INVENTOR.
ROLF B. LOCHINGER
BY Samuel Cohen
Attorney

United States Patent Office 3,308,433

Patented Mar. 7, 1967

3,308,433

SWITCHING MATRIX

Rolf B. Lochinger, Plainsboro, N.J., assignor to Radio Corporation of America, a corporation of Delaware Filed Jan. 10, 1963, Ser. No. 250,645
13 Claims. (Cl. 340—166)

The present invention relates generally to data processing and, more particularly, to circuits which, in response to binary inputs, cause a drive current to be applied to a particular one of a number of output lines.

The circuits used for decoding binary information indicative, for example, of a storage location in a memory, include diode gates, or transistor gates, or magnetic gates, or combinations of such gates. Such a decoder is sometimes known as a "switching matrix" or "switching tree." If the input word to such a decoder has $n$ binary bits, the number of outputs which are possible from the decoder, that is, the number of output lines, any desired one of which the matrix can select, is $2^n$.

A serious disadvantage of certain decoders which employ diode gates is that relatively large direct currents are required to produce the voltages which back bias the diode gates in series with the lines it is desired not to select. These currents may, in fact, be larger than the signal current (the "drive" current) necessary for the line selected. In applications in which the drive current amplitude can be relatively low, this is not a serious deterrent. However, if the decoded signal is used directly to drive a memory line as, for example, in a particular high speed, magnetic memory to be discussed shortly, the drive currents required may be of the order of one hundred to several hundred milliamperes. In such applications, conventional diode decoders dissipate more power than desired.

The decoders of the present invention are new and improved diode decoders which are suitable for directly driving relatively small memories (as, for example memory arrays having 100 by 100 or less elements). The total number of switches required to select a given one of the output lines may be larger than in the known decoders discussed above. However, the power dissipation of the decoders of the invention is very low, only a small fraction of that of the prior art decoders.

A decoder matrix according to the present invention includes $n \times m$ output lines, arranged in $n$ first groups of $m$ lines each, where $m$ is an integer generally not greater than 10 and $n$ is an integer. The decoder includes $n$ first switching means, one per first group of lines, each switching means, when closed, applying a drive current to all of the lines in its group. The decoder also includes $m$ second switching means, each connected to a different group of $n$ lines each. Each line in a group of $n$ lines is in a different first group. Each second switching means, when closed, provides a low impedance path for drive current appearing on lines to which it is connected.

The invention is discussed in greater detail below and is illustrated in the following drawings of which:

Figure 6:
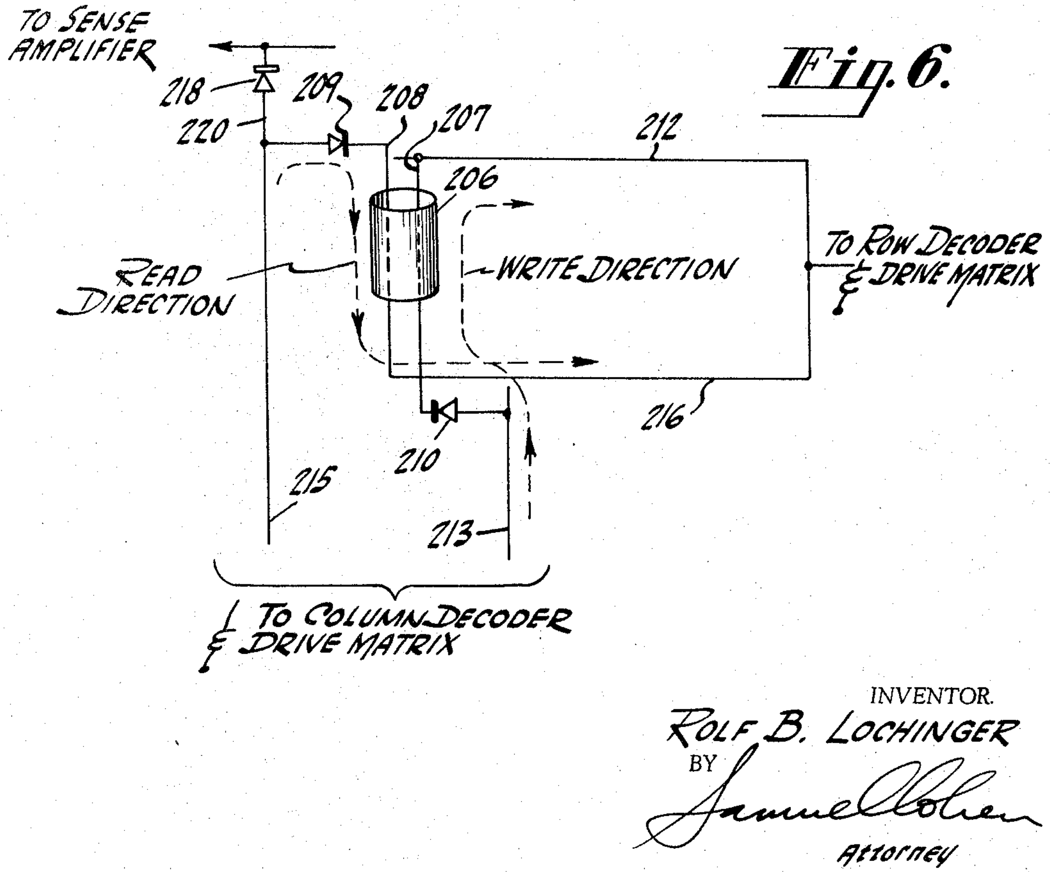
Figure 5A:
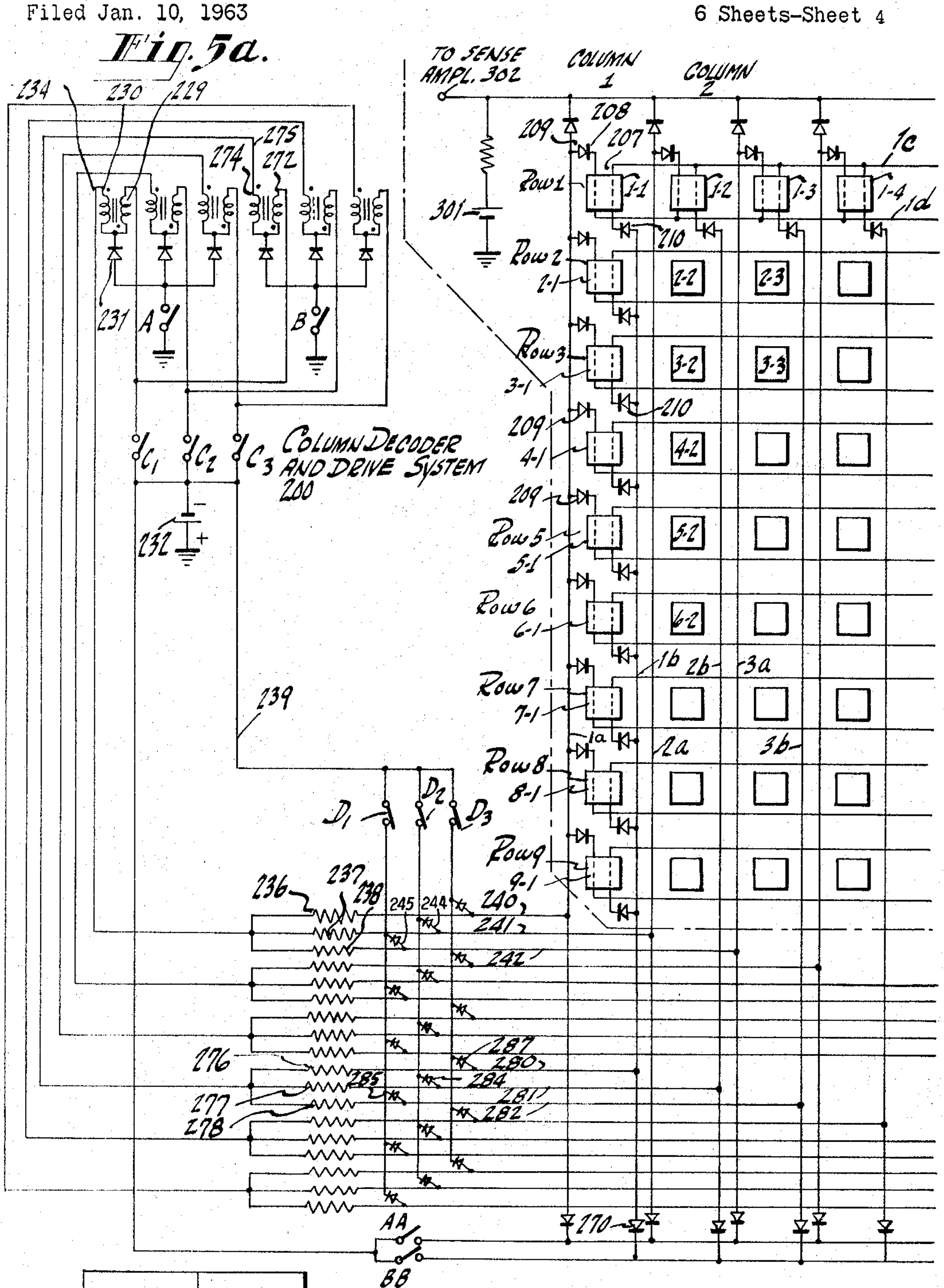
Figure 5A:
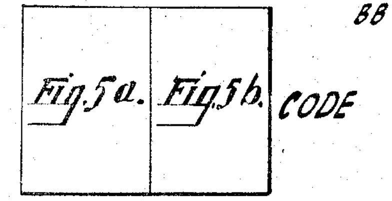
Figure 5B:
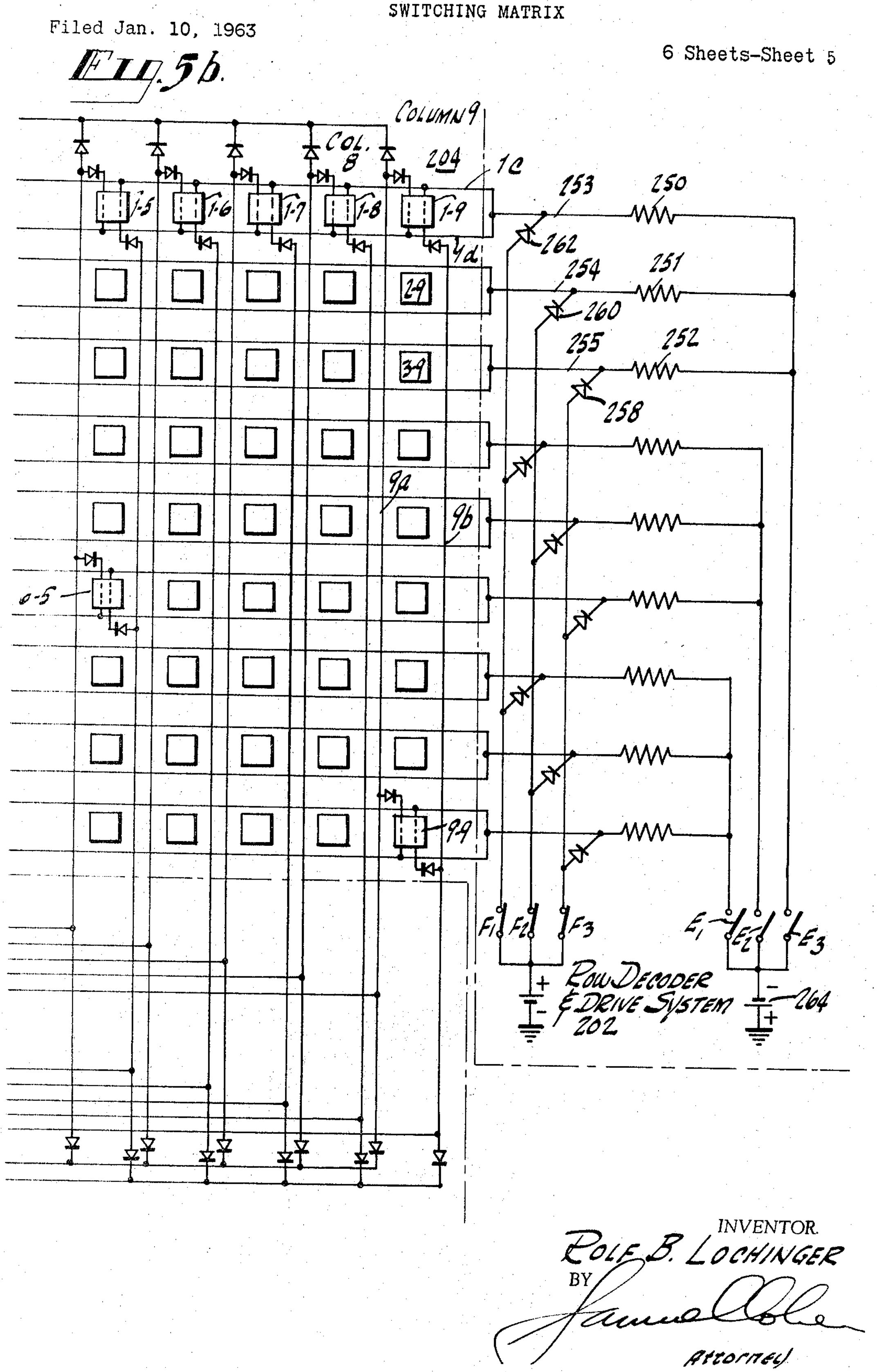

FIG. 5 (consisting of FIGS. 5a and 5b, on two seperate sheets) is a schematic circuit diagram of another embodiment of the system according to the invention, which system includes decoders, drivers and a memory;

FIG. 6 is a schematic circuit diagram showing a storage element of the memory of FIG. 5; and FIG. 7 is a chart which describes the operation of the system of FIG. 5.

Throughout the figures, similar reference numerals are applied to similar elements.

Figure 1:
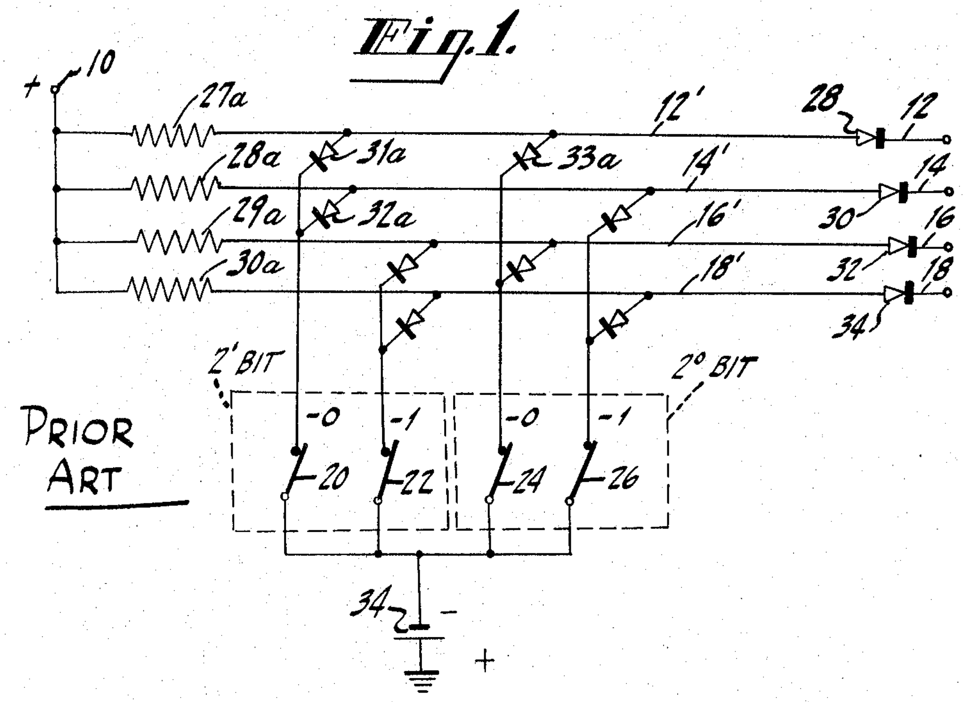
FIG. 1 is a schematic drawing of a prior art diode decoder.

The prior art decoder of FIG. 1 includes terminal 10 to which a positive voltage source may be connected and four output lines 12, 14, 16 and 18. Switches 20, 22, 24 and 26 (which may be transistors) are connected in various ways through diodes to the different lines. Additional diodes 28, 30, 32 and 34 are connected in series with the various lines.

In the operation of the decoder of FIG. 1, in its quiescent condition, all of the switches 20, 22, 24 and 26 are closed. This causes current to flow from terminal 10 through resistors **27*a*–30*a*, respectively, and through the diodes such as 31*a*, 32*a*, 33*a* and so on, through the switches to the negative terminal of the battery 34. This causes the voltages present at 12′, 14′, 16′ and 18′ to be negative so that the diodes 28, 30, 32 and 34** are reverse biased.

In order to select one of the four output lines, two of the switches are opened. For example, if switches 20 and 24 are opened and switches 22 and 26 remain closed, there is no return path from line 12′ through a switch to the negative terminal of battery 34. Therefore, this line carries a positive voltage. The remaining lines 14′, 16′ and 18′ all carry a negative voltage. Accordingly, diode 28 is forward biased and can carry the drive current available at terminal 10 via line 12 to a desired line passing through cores in the memory, whereas diodes 30, 32 and 34 remain reverse biased. If line 12 is a row line, a decoder matrix similar to the one shown in FIG. 1 may be employed to select the desired column line in the memory.

The serious disadvantage of the decoder of FIG. 1 is the amount of power it dissipates. In its quiescent condition, current passes through resistors **27*a*, 28*a*, 29*a* and 30*a* and this current is relatively high. In one practical system, for example, designed for selecting one in sixty-four lines of a memory, the quiescent current is roughly 170 milliamperes, per line. In this same memory, the line selected, when certain of the switches are opened, carries about 100 milliamperes. In the memory employing sixty-four lines, the total current drawn, substantially continuously, is close to 11 amperes. One might think that the power dissipation might be lessened by employing a pulsed power supply connected to terminal 10** rather than a direct current power supply. However, in practice, transistors are employed for the drive current source and it is not practical to turn these on and off at such high power levels.

In the decoder to be described below, operating at a full duty cycle of 30 percent (70 percent quiescent time, 30 percent read or write time), the power dissipated is 2 to 4 percent of the power of the comparable prior art decoder discussed above. The exact figure for power dissipation depends to some extent upon the switch configuration employed, assuming that the values of resistors and other elements remain fixed. For example, with the arrangement of FIG. 4, which requires 20 switches, the power dissipation is roughly 2 percent of that of the prior art arrangement. A different switch arrangement which employs only 16 rather than 20 switches for driving any one of 64 lines has a power dissipation of roughly 4 percent of the prior art arrangement.

Figure 2:
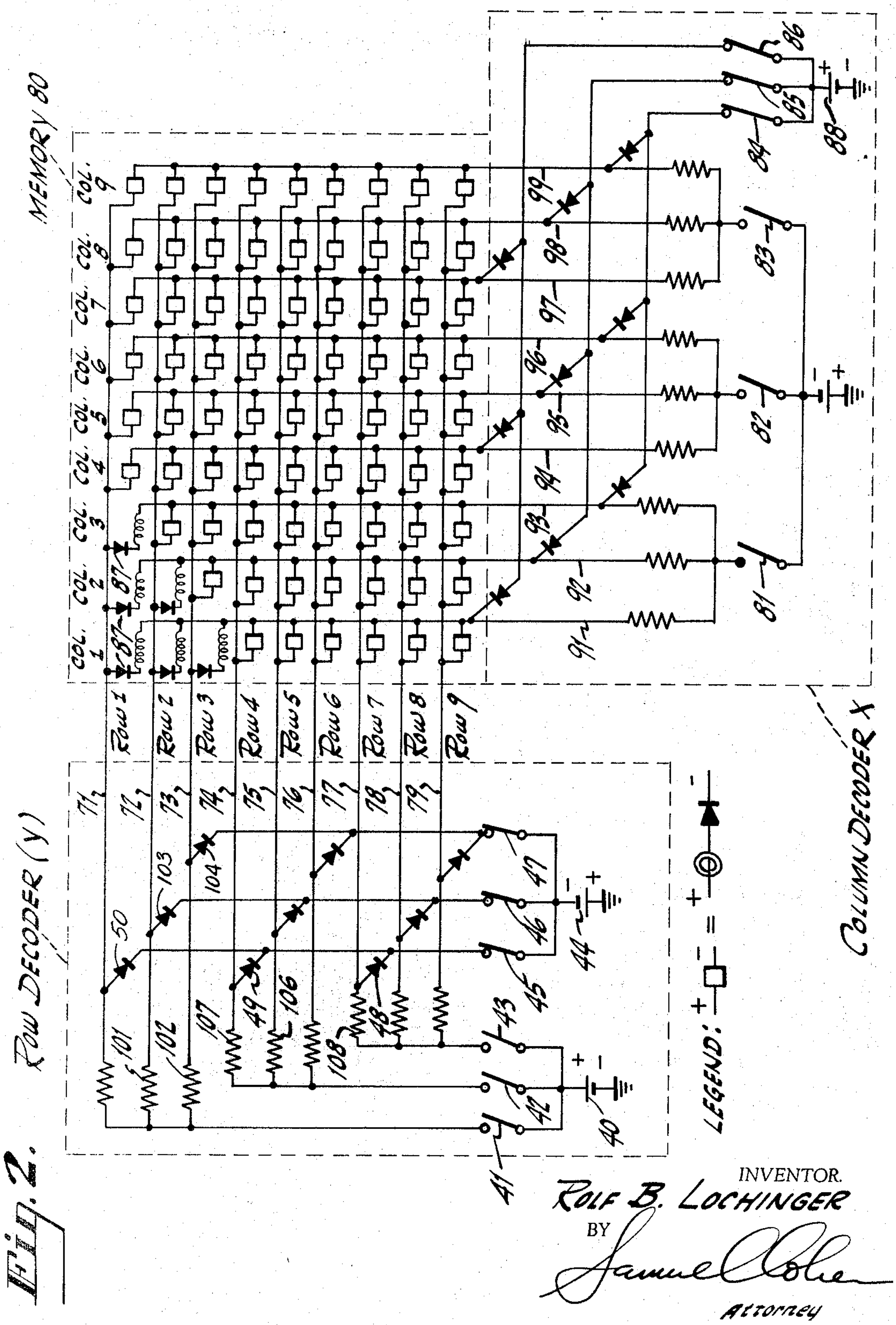
FIG. 2 is a schematic drawing of a system according to the present invention which includes a memory and diode decoders.

A system, according to the present invention, is shown in FIG. 2. For purposes of drawing simplicity and ease of explanation, the decoders selected for illustration each include six switches and each selects 1 in 9 lines. The principles of operation are, of course, applicable to much larger decoders than this.

In the system of FIG. 2, the row decoder Y and column decoder X are identical except for diode and voltage polarities Therefore, only the row decoder will be discussed in detail. The latter includes a power supply, shown schematically as a battery 40, connected at its positive terminal to switches 41, 42 and 43 and at its negative terminal to ground. It also includes a power supply, shown as a battery 44, connected at its negative terminal to switches 45, 46 and 47 and at its positive terminal to ground. Each of the switches 41, 42 and 43 is connected through three resistors to three output lines, respectively. Each of the switches 45, 46 and 47 is connected through diodes to different ones of the output lines. For example, switch 45 is connected through diodes 48, 49 and 50 to output lines 77, 74 and 71, respectively.

The nine output lines of the row decoder Y are connected to the nine rows, respectively, of the memory 80. The memory includes 9×9, that is, 81 storage locations. Each storage element includes a core, two windings passing through the core, and a diode in series with each winding. One diode and its winding passes current in one direction through the core and the other winding and its diode passes current in the opposite direction through the core. For the sake of drawing simplicity, only one diode and one winding are shown per core. This winding is illustrated schematically by an inductor symbol. Also omitted from FIG. 2 are the decoders necessary to drive a current through the omitted winding and diode of each core. These decoders may be identical to the two shown.

The source 40 and its switches together may be considered to be a drive current source. In practice, these switches may be transistors and one of them is activated for an interval sufficient to produce a short duration, sharp rise time current pulse. The pulse duration may be under 50 nanoseconds (measured at its base) and the rise and fall times may be less than 10 nanoseconds, each. The source 44, switches 45, 46 and 47 and the coupling diodes such as 50, 103 and so on which are connected to these switches, may be considered low impedance by-pass circuits. As in the case of switches 41–43, switches 45–47 may be transistors and may be operated concurrently with switches 41–43. This is discussed in more detail later.

In the operation of the system of FIG. 2, the switches 45, 46 and 47 may be considered to be normally closed and the switches 41, 42 and 43 are normally open. In a similar manner, in the column decoder X, the switches 81, 82 and 83 are normally open and the switches 84, 85 and 86 may be considered to be normally closed. The closed switches 45, 46 and 47 cause negative voltages to appear on the output lines 71 through 79. These negative voltages reverse bias the diodes 87 of the memory. In a similar manner, the source 88 applies a positive voltage through the various diodes connected to switches 84–86 to the output lines 91 through 99, reverse biasing the diodes 87 of the memory.

Assume now that it is desired to select memory location 1–1. The notation 1–1 refers to the core which is located in row 1 and column 1. Switch 41 is closed; switches 42 and 43 remain open; switch 45 is opened; switches 46 and 47 remain closed; switch 81 is closed; switches 82 and 83 remain open; switch 86 is opened; switches 84 and 85 remain closed. When switch 41 is closed and switch 45 is opened, a positive voltage develops on line 71. Current also flows from source 40 through switch 41 through resistors 101 and 102, through diodes 103 and 104, respectively, and through closed switches 46 and 47 to the negative terminal of power supply 44. As the impedance of diodes 103 and 104 is low, when they draw any appreciable amount of current, the lines 72 and 73 assume a negative voltage, back biasing the diodes 87 in rows 2 and 3. The lines 75, 76, 78 and 79, which are connected to the closed switches 46 and 47, are also at a negative value of voltage in view of the open switches 42 and 43. Therefore, the diodes 87 of rows 5, 6, 8 and 9 of the memory are back biased. As the switch 45 is open, one might think that lines 74 and 77 float. However, the negative voltage on line 75, for example, is applied through resistors 106 and 107 to line 74 keeping this line negative. No appreciable current is drawn. In a similar manner line 77 is coupled through resistor 108 to a line such as 77 or 79 which is negative so that line 77 is maintained at a negative value of voltage also. Therefore, the diodes of rows 4 and 7 of the memory are also back biased.

The column decoder X operates in a manner similar to the row decoder Y. When switch 81 is closed and switch 86 is open, line 91 assumes a negative value of voltage. The closed switches 85 and 86 maintain the remaining lines 92–99 at a positive value of voltage.

To summarize the above, with the switches thrown to the positions indicated above, line 71 goes positive and line 91 goes negative. This causes current to flow through the diode 87 and its core in memory location 1–1. Current does not flow through any other diode or core in the memory. As already indicated, current can be applied in the opposite direction through each core by a second winding passing through the core with a diode connected in series with that second winding.

As already indicated, the important advantage of the decoder arrangement of FIG. 2 is that it requires very little power dissipation. In the example chosen for illustration, switches 46 and 47 are closed and switch 45 is open. However, the closed switches 46 and 47 draw current from only two lines, namely 72 and 73 and draw this current only during the actual operation of the memory. During the periods between the operation of the memory (70 percent of the time if one assumes a 30 percent duty cycle) the switches 44, 42 and 43 will all open. Therefore, even though the switches 45, 46 and 47 may be closed, the system dissipates substantially no power since the source 44 does not cause any current to flow but only maintains the lines 71 through 79 at a voltage level to reverse biase the diodes of the memory.

Figure 3:
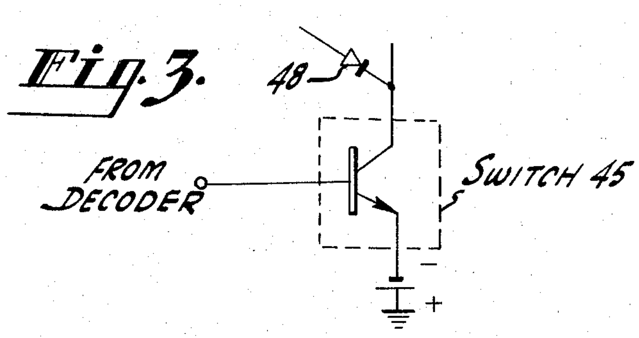
FIG. 3 is a schematic drawing of a switch of the type suitable for use in the decoders of FIG. 2.

The various switches of the system of FIG. 2 are illustrated as mechanical switches. In practice, the switches are actually transistors as, for example, is shown in FIG. 3. Preferably NPN transistors are employed throughout the system as those which currently are commercially available are capable of higher operating speeds than those of the PNP type. However, PNP transistors may, of course be used instead or, if desired, NPN transistors can be used for switches connected to the power supplies of one polarity and PNP transistors for the switches connected to the power supplies of opposite polarity. In the description of the operation of the circuit of FIG. 2, it is stated that the switches 45–47 are normally closed. The decoder can be operated in this way by applying a relatively small value of base current to the transistor in a sense to forward bias the transistor. However, in a preferred method of operating the decoder, during the periods between which memory selection occurs, the switches 45, 46 and 47 are actually open (a slight value of reverse bias current being applied to the base of the transistor). When it is desired to select a memory location, two of the switches such as 46 and 47 are closed and one of the switches 41, 42 and 43 is closed by applying a sufficiently heavy base current to these three transistors to permit them quickly to be driven into saturation. The synchronization between the switches may be such that the base current arrives at the two switches to be closed of the group 45–47 slightly before the time it arrives at a switch such as 41. This is to permit the two transistors of switches 45–47 to be ready to by-pass the drive current (the current provided by source 40) present on non-selected lines, before the diodes 87 connected to these non-selected lines can be forward biased. In other words, the mode of operation, just described enables a memory location to be selected in a shorter interval of time than if only a small quiescent base current were continuously applied to the transistors making up the switches such as 45, 46, 47, 84, 85 and 86. In addition, in the mode of operation just described, "half-select" noise signals appearing on lines not selected are substantially reduced.

The decoder of the invention is not limited to a symmetrical arrangement. To illustrate this, a decoder which is capable of selecting one out of 64 different output lines is illustrated in part in FIG. 4. In this decoder, the lines are divided into groups of four. Each of the driver switches 1a–16a controls one group of 4 lines. In addition, there are 4 "normally closed" by-pass switches 110–114. Thus a total of 20 switches is required in this arrangement to control the selection of one out of 64 output lines.

Figure 4:
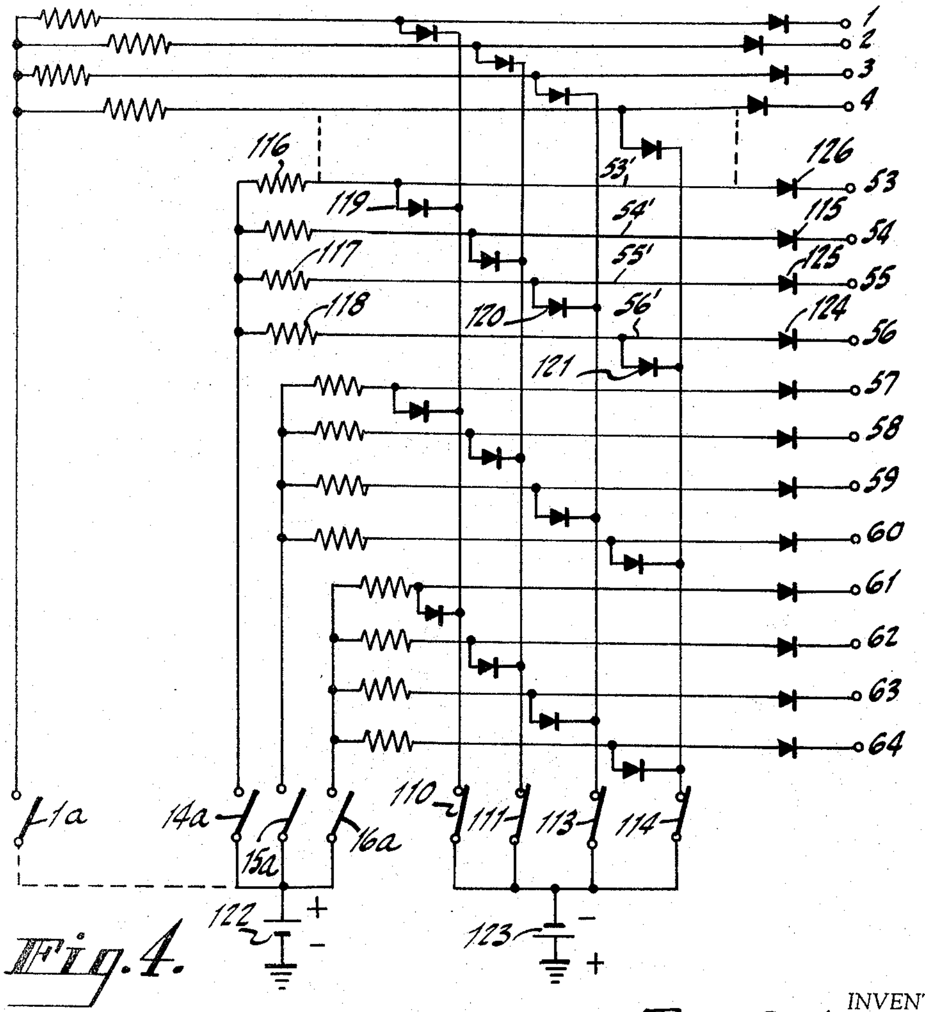
FIG. 4 is a schematic drawing of a modified form of decoder according to the present invention.

The operation of the decoder matrix of FIG. 4 is analogous to that of either decoder matrix of FIG. 2. For example, suppose it is desired to select output line 54. Switch 14a is closed and switches 1a–13a, 15a and 16a remain open. Switch 111 is opened while switches 110, 113 and 114 remain closed. The closed switch 14a causes the line 54' to be positive forward biasing the diode 115. This diode may be considered to be one of the diodes in the memory matrix. The closed switch 14a also causes current to flow through resistors 116, 117 and 118 through diodes 119, 120 and 121, respectively and through closed switches 110, 113 and 114 to the negative terminal of source 123. Accordingly, the lines 53', 55' and 56' go negative, reverse biasing the diodes 124, 125 and 126, respectively. It can readily be shown that the remaining diodes, other than 115, in series with the output lines, are also reverse biased.

The system of FIG. 5 includes a column decoder and drive system 200, a row decoder and drive system 202 and a memory 204. The memory and its operation is discussed in detail in co-pending application Serial No. 209,013, now Patent No. 3,229,226, filed July 11, 1962 by J. A. Rajchman and assigned to the same assignee as the present invention. An enlarged view of one of the memory elements is shown in FIG. 6. It includes a ferrite core 206 with two windings 207 and 208, respectively, which pass through the core. A diode 209 is connected in series with one of the windings and the second diode 210 is connected in series with the second winding.

To write a "one" into the memory element of FIG. 6, the row lead 212 is made negative at the same time that the column lead 213 is made positive. This causes current to flow through diode 210 at a level sufficient to switch core 206 to one of its stable states. To read a memory element, the column lead 215 is made positive and the row lead 216 is made negative. If the core 206 is storing a "one" the current which flows from lead 215 through diode 209 and winding 208 will switch the core to a state representing storage of the binary bit "zero." The back voltage thereby developed will cause current flow through diode 218 (which is normally back biased) to the sense amplifier in the manner discussed in the co-pending application. On the other hand, if the core 206 is initially storing a "zero" the current flow through winding 208 will cause the core to be driven further into the "zero state" and no sense output signal will develop at lead 220.

Returning to FIG. 5, the cores 206 are illustrated as rectangles. In a number of cases the windings passing through the cores and the diodes connected to these windings are illustrated. To simplify the drawing, these connections are omitted in other cases, as they are obvious.

The operation of the system of FIG. 5, for typical memory locations, is given succintly in the table of FIG. 7. However, to illustrate the operation, two examples from the table will be discussed. The same row, column identification of memory locations is employed as in FIG. 2.

Assume first that it is desired to read memory location 1–1. Switch A is closed; switch B is open; switch $C_1$ is closed and switches $C_2$ and $C_3$ are open. When switches $C_1$ and A are closed, the two windings 229 and 230 act as the primary and secondary windings, respectively, of a transformer. Current flows from ground through switch A, through diode 231, through primary winding 229, through closed switch $C_1$ to the negative terminal of power supply 232. It is to be appreciated that the source 232 and switch $C_1$, together, act like a source of a fast rise time pulse. In practice, this pulse may have a duration of 30 nanoseconds at the base of the pulse and a rise time of less than 10 nanoseconds. The pulse applied to the primary winding 229 causes a positive going pulse to develop at the lead 234 connected to the secondary winding 230. This positive pulse is applied through resistors 236, 237 and 238 to the lines 240, 241 and 242.

Switches $D_1$ and $D_2$ are closed and switch $D_3$ is open. Therefore, the diodes 244 and 245 conduct and lines 241 and 242 go negative as line 239 leads to the negative terminal of source 232. Switch $D_3$ is open so that line 240 is positive and column lead 1a goes positive.

In the row decoder and drive system 202, switch $F_1$ is open; switches $F_2$ and $F_3$ are closed; switch $E_3$ is closed and switches $E_1$ and $E_2$ are open. Closed switch $E_3$ is connected through resistors 250, 251 and 252 to leads 253, 254 and 255, respectively. Therefore, current flows from source 256 through closed switches $F_2$ and $F_3$ and through diodes 258 and 260 causing lines 254 and 255 to go positive. Switch $F_1$ is open so that diode 262 does not conduct and a negative voltage due to source 264 appears on line 253. This negative voltage is carried by row lead 1d. Accordingly, the coupling diode 209 of memory element 1–1 conducts current in the forward direction. If this current switches the core, diode 48, which is normally reverse biased by source 301, is caused to conduct, and a sense signal appears at lead 302.

The switch AA is open and the switch BB is closed. Closed switch BB is connected to the negative terminal of source 232. The negative voltage is applied through coupling diode 270 to the column lead 1b thereby reverse biasing all diodes 210 connected to that column lead. This prevents the diodes 210 from conducting even though the row lead 1c is negative.

During the read operation just described, the windings 272 and 274 are connected through closed switch $C_1$ to the negative terminal of battery 232. However, the switch B is open so that the windings 272 and 274 do not act like a transformer. Instead they act like two inductors connected in series and function as a radio frequency choke. The lead 275 which is connected to winding 274 is coupled through resistor 276 to the column conductor 1b. However, in view of the fact that the windings 272 and 274 act as a choke, the fast rise time pulse due to the closing of switch $C_1$ does not pass to the column conductor 1b.

The writing of information into a memory location is accomplished in a manner quite similar to the read-out of information from the memory. Assume that it is desired to write a "one" into the memory location 1–1. Switch B is closed and switch A is open; switch $C_1$ is closed and switches $C_2$ and $C_3$ are open. The closed switches $C_1$ and B cause a positive pulse to appear at lead 275. This positive pulse is applied via resistors 276, 277 and 278 to the leads 280, 281 and 282. Switches $D_1$ and $D_2$ are closed and switch $D_3$ is open. Therefore, diodes 284, and 285 conduct so that leads 281 and 282 go negative. Diode 287 does not conduct so that lead 280 applies a positive pulse to column 1*b*.

Switches $F_2$ and $F_3$ are closed and switch $F_1$ is open. Switch $E_3$ is closed and switches $E_1$ and $E_2$ are open. This switch combination causes a negative voltage to appear on row lead 1*c* in a manner similar to that already discussed in connection with the read cycle. The positive voltage on column lead 1*b* and negative voltage on row lead 1*c* cause current to flow through diode 210 of the core of memory location 1–1.

Switch BB Bis open and AA is closed. The closed switch AA causes a negative voltage to appear on lead 1*a* reverse biasing all of the diodes 209 connected to lead 1*a*. This prevents current in the read direction from flowing through any of the cores.

In a manner analogous to that already discussed, during the write cycle the windings connected to open switch A act like radio frequency chokes. This prevents the fast rise time pulse, due to the closing of one of the switches C, from passing to the 1*a*, 2*a*, etc., columns.

What is claimed is:

1. In a decoder matrix,
$n \times m$ output lines arranged in $n$ first groups of $m$ lines each, where $m$ is an integer greater than 1 and not greater than 10 and $n$ is an integer greater than 1;
$n$ first switching means, one per first group of lines, each switching means, when closed, applying a drive current to all lines in its group;
$m \times n$ unidirectionally conducting elements; and
$m$ second switching means, each connected to a different group of $n$ lines through $n$ of said elements, respectively, and each line in a group of $n$ lines being in a different first group, each second switching means, when closed, providing a low impedance path via the unidirectionally conducting elements coupled thereto for drive current appearing on lines to which it is connected.

2. In a decoder matrix,
$n \times m$ output lines arranged in $n$ first groups of $m$ lines each, where $m$ is an integer greater than 1 and not greater than 10, and $n$ is an integer greater than 2;
$n$ first switching means, one per first group of lines, each switching means, when closed, for applying a drive current to all lines in its group;
$m \times n$ unidirectionally conducting elements; and
$m$ second switching means each switching means connected to a different group of $n$ lines through $n$ of said elements, respectively, and each line in a group of $n$ lines being in a different first group, each second switching means, when closed providing a low impedance path via the unidirectionally conducting elements coupled thereto for drive current appearing on lines to which it is connected.

3. In a decoder matrix,
$n \times m$ output lines arranged in $n$ first groups of $m$ lines each, where $m$ is an integer greater than 1 and not greater than 10, and $n$ is an integer greater than 1;
$n$ first switching means, one per first group of lines, each switching means, when closed, for applying a drive current to all lines in its group;
$n \times m$ diodes, one connected to each line, and each diode poled to conduct drive current appearing on its line;
$m$ second switching means each coupled to a different group of $n$ lines each, through the respective diodes coupled to said lines, each line in a group of $n$ lines being in a different first group, each second switching means, when closed, providing a low impedance path for drive current appearing on lines to which it is connected.

4. In a decoder matrix,
$n \times m$ resistors, where $m$ is an integer greater than 1 and not greater than 10, and $n$ is an integer greater than 1;
$n \times m$ output lines arranged in $n$ first groups of $m$ lines each, each line connected to a different resistor;
$n$ first switching means, one per first group of lines, each switching means, when closed, for applying a drive current to all lines in its group, through the resistors connected to the respective lines;
$n \times m$ diodes, each directly connected to a different line, and each diode poled to conduct the drive current, if any, which reaches a line through the resistor coupled to that line;
and $m$ second switching means each switching means connected to a different group of $n$ lines each, through the respective diodes coupled to said lines, and each line in a group of $n$ lines being in a different first group, each second switching means, when closed, providing a low impedance path for drive current appearing on lines to which it is connected.

5. In combination,
two inductively coupled windings, each having first and second terminals, connected together at said first terminals;
two terminals for a current source;
switch means connected between one terminal of the current source and the first terminals of said windings;
a connection between the other terminal of said current source and the second terminal of the winding; and
a load circuit coupled between said one terminal of said current source and the second terminal of said other winding, whereby when said current source is made operative, the position of said switch determines whether said coupled windings perform the function of a transformer or series choke.

6. A memory system comprising, in combination,
(a) a row decoder matrix including:
$n \times m$ resistors, where $m$ is an integer greater than 1 and not greater than 10, and $n$ is an integer greater than 1;
$n \times m$ output lines arranged in $n$ first groups of $m$ lines each, each line connected to a different resistor;
$n$ first switching means, one per first group of lines, each switching means, when closed, for applying a drive current to all lines in its group, through the resistors connected to the respective lines;
$n \times m$ diodes, each directly connected to a different line, and each diode poled to conduct the drive current, if any, which reaches a line through the resistor coupled to that line; and
$m$ second switching means, each switching means connected to a different group of $n$ lines each, through the respective diodes coupled to said lines, and each line in a group of $n$ lines being in a different first group, each second switching means, when closed, providing a low impedance path for drive current appearing on lines to which it is connected;
(b) a column decoder matrix as set forth above under (a) but which produces a drive current of a polarity opposite to that produced by the row matrix; and
(c) a memory including:
$(n \times m)^2$ magnetic memory elements, one at the intersection of each row and column line;
a winding associated with each memory element;
and a diode in series with each winding and poled to pass the drive current produced by the row and column matrices.

7. In a memory,
$m$ columns of magnetic elements, each magnetic element having two windings, one for passing a current in one direction through the magnetic element and the other for passing a current in the other direction through the magnetic element, and each winding having in series therewith a diode poled to pass current in the desired direction;

$2m$ column conductors, one pair per column, the first conductor of each pair of said conductors being connected to one of the windings of each memory element in that column and the second conductor of each pair of conductors being connected to the other winding of each memory element in that column;

$m$ drive lines, each connected to a different first column conductor, and $m$ drive lines, each connected to a different second column conductor, each group of $m$ drive lines being sub-divided into $n$ sub-groups having $p$ conductors each;

$n$ switch means each coupled to two sub-groups of conductors, one of the sub-groups leading to the first column conductors and the other to the second column conductors, each switch means, when closed, applying a drive current to the sub-groups of lines to which they are connected;

means for essentially disconnecting one sub-group of wires from a switch means when that switch means is closed, whereby said switch means drives only one sub-group of wires;

and $p$ switch means for by-passing drive current, each of the last-named switch means connected to $2n$ conductors, and each of the $2n$ conductors being in a different group, where $m$, $n$ and $p$ are all integers greater than 1.

8. In a memory, $m$ columns of magnetic elements, each magnetic element having two windings, one for passing a current in one direction through the magnetic element and the other for passing a current in the other direction through the magnetic element, and each winding having in series therewith a diode poled to pass current in the desired direction;

$2m$ column conductors, one pair of conductors per column, the first conductor of each pair of said conductors being connected to one of the windings of each memory element in that column and the second conductor of each pair of conductors being connected to the other winding of each memory element in that column;

$m$ drive lines, each connected to a different first column conductor, and $m$ drive lines, each connected to a different second column conductor, each group of $m$ drive lines being sub-divided into $n$ sub-groups having $p$ conductors each;

$p \times n$ pairs of coupled inductors;

$n$ switch means, each coupled through two pairs of inductors to two sub-groups of drive lines, respectively, one of the sub-groups leading to the first column conductors and the other to the second column conductors, each switch means, when closed, tending to apply a drive current to both sub-groups of drive lines to which it is connected;

means for causing one pair of coupled inductors for a sub-group of lines to which a drive current is applied to act as a choke, thereby essentially disconnecting that sub-group of lines from a switch means when that switch means is closed, and means for causing the other pair of coupled inductors connected to the same closed switch means to act as a transformer, whereby said closed switch means applies drive current only to the other sub-group of lines coupled thereto;

and $p$ switch means for by-passing drive current, each of the last-named switch means connected to $2n$ lines, and each of the $2n$ lines being in a different sub-group, where $n$, $m$ and $p$ are all integers greater than 1.

9. In a memory as set forth in claim 8, said means for coupling one pair of coupled inductors for a sub-group of lines to which a drive current is applied to act as a choke comprising, a return path for drive current, a serial connection between the two inductors, and an open connection between the return path and said serial connection; and said means for coupling the other pair of coupler inductors connected to the same closed switch means to act as a transformer comprising:

said return path for the drive current, a serial connection between the last-named coupled inductors, and a connection between said serial connection and said return path, whereby current flows through one inductor to the return path and induces a voltage across the second inductor.

10. In combination, two inductor means, each including two serially connected, inductively coupled windings;

means connected to one winding of each inductor means for applying a drive current to both inductor means;

a load circuit coupled to the other winding of each inductor means;

a return path for the drive current;

and two switch means, one connected between each serial connection between coupled windings and said return path, whereby when one of said switch means is closed and the other is open, one inductor means operates as a series inductor and the other operates as a transformer.

11. In combination, two inductor means, each including two serially connected, inductively coupled windings;

means connected to one winding of each inductor means for applying a drive current to both inductor means;

a load circuit coupled between the other winding of each inductor means and a point of reference potential;

and two switch means, one connected between each serial conection between coupled windings and said point of reference potential, whereby when one of said switch means is closed and the other is open, one inductor means operates as a series inductor and the other operates as a transformer.

12. In combination, two inductor means, each including two serially connected, inductively coupled windings;

drive means connected to one winding of each inductor means for applying a drive current pulse to both inductor means;

two load circuits one of which is to receive the drive current pulse, coupled to the second windings, respectively, of the inductor means;

a return path for the drive current pulse;

and two switch means, one connected between each serial connection between coupled windings and said return path, whereby when one of said switch means is closed and the other is open, one inductor means operates as a choke and offers a high impedance to said drive current pulse, and the other operates as a transformer and applied a drive current pulse to its load circuit.

13. In combination, two inductively coupled windings, each having first and second terminals, connected together at said first terminals;

a driver for producing a fast rise time current pulse at its output terminal, when energized;

switch means connected between a point of reference potential and the first terminals of said windings;

a connection between said output terminal of said driver and the second terminal of the winding; and a load circuit coupled between said point of refernce potential and the second terminal of said other winding, whereby when said driver is energized, the position of said switch determines whether said coupled windings operate as a transformer or a radio frequency choke.

References Cited by the Examiner

UNITED STATES PATENTS

| | | | |
|---|---|---|---|
| 2,747,023 | 5/1956 | Hagenhaus. | |
| 2,853,693 | 9/1958 | Lindenblad | 340—147 |

NEIL C. READ, *Primary Examiner.*

P. XIARHOS, A. J. KASPER, *Assistant Examiners.*